United States Patent

[11] 3,612,140

| [72] | Inventor | Sylvester William Malinski<br>P.O. Box 161, Tamaroa, Ill. 62888 |
|---|---|---|
| [21] | Appl. No. | 6,469 |
| [22] | Filed | Jan. 28, 1970 |
| [45] | Patented | Oct. 12, 1971 |

[54] APPARATUS FOR MOUNTING TIRE CASINGS ONTO DUAL-FLANGED RIMS
3 Claims, 3 Drawing Figs.

| [52] | U.S. Cl. | 157/1.17 |
|---|---|---|
| [51] | Int. Cl. | B60c 25/06 |
| [50] | Field of Search | 157/1.17 |

[56] References Cited
UNITED STATES PATENTS

| 3,489,198 | 1/1970 | Malinski | 157/1.17 |

*Primary Examiner*—Granville Y. Custer, Jr
*Attorney*—Jerome A. Gross

ABSTRACT: For mounting large tire casings on tractors and other off-highway vehicles, this apparatus is of the type having a linear actuator whose shoe presses slantingly against the tread of a tire casing, to drive a portion of a sidewall bead against the drop center of the rim; then presses further to shift the sidewall to the other side of center, permitting the remainder of its bead to be deflected over the rim.

PATENTED OCT 12 1971
3,612,140
FIG. 1
FIG. 2
FIG. 3
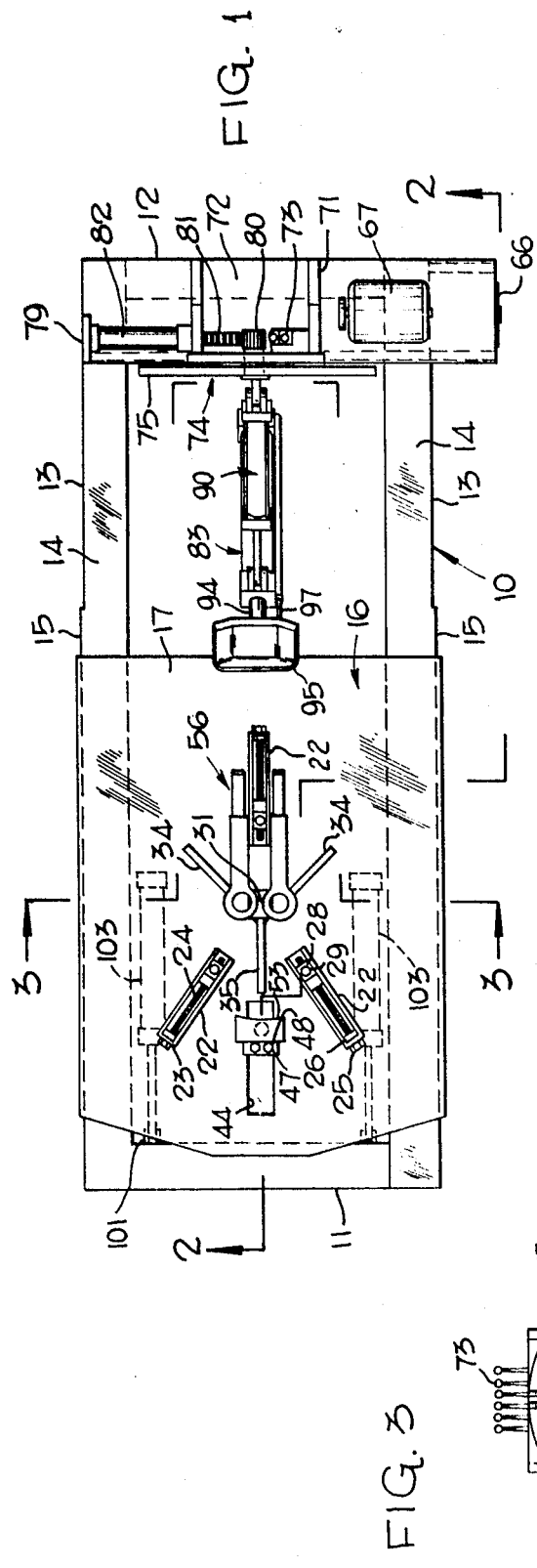
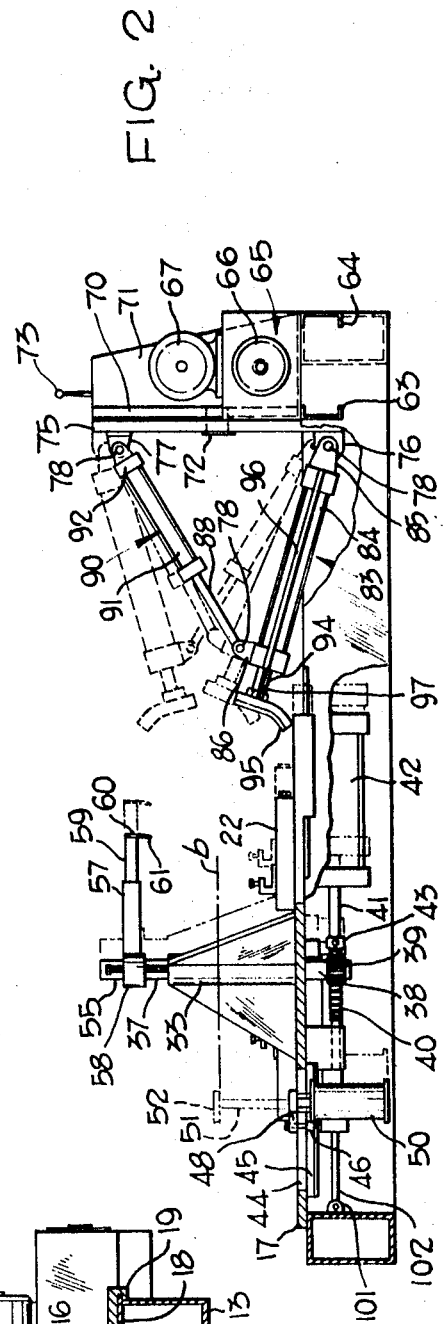
Inventor
SYLVESTER WILLIAM MALINSKI
By *Jerome M. Lions*
Attorney

APPARATUS FOR MOUNTING TIRE CASINGS ONTO DUAL-FLANGED RIMS

A hydraulic triangulating strut, which alters the slant of the linear actuator, nd a hydraulically traversed rim carriage, permit modifying the direction of force application by the shoe as the operation proceeds. By effectively applying the force of the shoe either more vertically or more horizontally, the operator may deftly manipulate a tire casing to complete the mounting operation. The apparatus is similarly useful for demounting the casing.

BACKGROUND OF THE INVENTION

The present invention relates to that type of apparatus, used for mounting and demounting heavy pneumatic tire casings, which is described in my prior invention. U.S. Pat. No. 3,489,198 issued Jan. 13, 1970. Before my prior invention, double-flanged rims (usually referred to as "drop center" rims) could not be utilized successfully with the large-sized tire casings used on tractors and other off-highway vehicles. Instead, such large heavy casings were mounted on cylindrical wheel rims having one removable flange, in a difficult process which endangered the operator whenever there was pressure in the casing.

My prior patent disclosed a new type of apparatus designed to mount and demount such casings onto large-sized drop center rims, and new process steps of doing so. The process steps included, for mounting such a casing, the steps of forcing a portion of one of the beads of the casing into the drop center of the rim; pressing inward on the tread of the casing to cause the drop center portion of the rim to bear against the casing bead; and then continuing to press until the casing sidewall adjacent to the bead compressively buckles. On buckling, the major portion of the sidewall will shift to the other side of center of the rim. As it shifts, it exerts tension on the bead, holding it out of round and permitting it to be progressively deflected over the rim flange.

The apparatus disclosed in my said patent, included a linear actuator mounted outboard of the rim position, along a fixed slanting axis extending inward toward the middle plane of the rim, mounted on a fixed platform. The mount for the actuator had a horizontal pivot located at about the level of the middle plane of the rim. Rotating the mount reversed its position, from a lower position, at which the actuator slanted at the fixed angle, upward toward the middle plane of the rim, to an upper position, at which it slanted downward toward the middle plane of the rim. At the innermost end of the linear actuator was a force-applying shoe. During actuation, it presses against the lower or upper edge of the tread on the casing, along the previously established upward or downward slanting axis. A vertical telescoping jack, positioned at the side of the platform opposite to the force-applying shoe, was used to demount the casing by pressing upward while the casing sidewalls were so shifted to that side of center of the rim.

SUMMARY OF THE INVENTION

The purposes of the present invention are to provide for more deft manipulations of such a heavy tire casing than was possible with the linear actuator of my previous apparatus, which could exert its force only along a predetermined axis. Modification of the direction of force application to one more vertical is useful, for example, to force a tire bead upward or downwardly to the level of the drop center of the rim. Modification of the direction of force application to one more horizontal is useful, for example, to shift the tire sidewall farther beyond center of the rim and draw its bead farther out of round.

Summarizing briefly and generally, the present apparatus provides means for modifying the position and direction of force application of the shoe mounted on principal linear actuator while bead deflectors traverse the rim to mount a tire, or while the telescoping jack is pressing the casing upward. A second actuator, operated independently of the first, serves, with the principal linear actuator and the rotatable mount, as a variable-length member in a triangulated structure. Extending or retracting the second actuator moves the principal actuator angularly about its lateral pivot to the rotatable mount. Such movement causes the shoe at the end of the principal actuator to exert a force perpendicular to the axis of the principal linear actuator.

In the improved apparatus, the means to support the rim has a traversing platform, moved by powered actuators on a longitudinal track toward and away from the reversible-position mount of the principal linear actuator. The platform actuators are controlled independently of the linear actuator. By moving the platform slowly toward the mount, the horizontal component of force applied to the casing is increased; by moving it slowly away, the horizontal force component is decreased.

BRIEF DESCRIPTION OF THE DRAWINGS

FIG. 1 is a top plan view of the present apparatus.

FIG. 2 is a view, partly in elevation and partly in section, taken along line 2—2 of FIG. 1. The phantom lines show movement of the parts during operation. The dashed lines show the principal linear actuator in reversed position.

FIG. 3 is a section view taken along line 3—3 of FIG. 1.

DESCRIPTION OF THE PREFERRED EMBODIMENT

A preferred embodiment of the present invention is shown in the drawings. A rigid fixed frame, generally designated 10, is of welded steel construction. It includes a left end box beam 11, shown in FIGS. 1 and 2, and a corresponding right end box beam 12, flanked and connected by a longitudinal side box beam 13. The side box beams 13 have upper surfaces referred to as track surfaces 14; Commencing at the left end and extending beyond the middle of the frame 10, the upper track surfaces 14 have outward-projecting track portions 15 as seen in FIGS. 1 and 3.

Mounted on the track surfaces 14 of the side box means 13 is a traversing platform generally designated 16. It includes a heavy, bend-resistant platform 17, whose laterally outer undersurfaces 18 serve as slide portions; lubricating means, not shown, permit reversible longitudinal movements of the platform 16 on the track portions 15. Reverse edge flanges 19, best shown in FIG. 3, engage the outward-projecting track portions 15 of the upper track surface 14, for sure alignment.

A principal function of the traversing platform 16 is to secure a large-size dual-flange wheel rim of conventional shape, not shown, at a fixed level with its upper flange free and its middle plane at substantially the level b shown in FIG. 2. For this purpose, on the upper surface of the platform 17 are simple rim-securing means which, as shown in FIGS. 1 and 2, may be three channel brackets 22, each having an end-closing plate 23 bored to receive a long threaded bolt 24 whose head 25 is retained adjacent to the closing plate 23 by a keying member 26. Within each of the flanges of the channel brackets 22, taped to ride on the bolt 24, is a C-shaped clamping foot 28 including a vertical setscrew 29. The channel brackets 22 are spaced angularly from each other about a platform center point 31, shown in the plan view FIG. 1, so that when a rim is secured in place by the C-shaped clamps 28 it will be approximately centered at the platform center point 31.

Means, similar to those used in my earlier apparatus, are provided to deflect the bead of a tire casing over the upper flange of a rim so held. These means include two heavy vertical support tubes 33, welded at their lower ends to the platform plate 17 spaced laterally close to each side of the platform center point 31. Heavy triangular gusset plates 34 extend outward, somewhat to the right as shown in FIG. 1, to stabilize each of the support tubes 33; the gusset plate 35, extending from centrally between them to the opposite side, supports both. The lower edges of the gusset plates 34, 35 are welded to the upper surface of the platform plate 17.

Through the support tubes 3 extend contrarotating parallel shafts 37, supported by keying means (not shown) to the support tubes, so that the lower shaft ends 38, which project downwardly beneath the platform plate 17, will be maintained at the level shown in FIG. 2. Onto the lower end 38 of each of the shafts 37 is fixedly mounted a pinion gear 39. Reciprocable longitudinally between them, to engage them for contrarotation is a rack 40, toothed on both sides. Longitudinal movement is transmitted to the rack 40 by a connector 43 to a projecting piston rod 41 of a rack linear actuator cylinder 42, shown in FIG. 2. The cylinder 42 is supported by and beneath the undersurface of the platform plate 17. Hydraulic controls and power supply means will hereafter be described.

Rearwardly of the rearward-extending gusset plate 35, the horizontal platform plate 17 has a central linear jack slot 44. Beneath the plate 17, on each side of the slot 44, is a guide channel 45. A rider block 46 therein, positioned by bolts 47, permits adjustable affixment along the slot 44 of a base support plate 48 which mounts therebeneath an upward-telescoping hydraulic jack 50. This jack serves as means to supply a vertical force, at the left side of the center point 31, to the underside wall of a tire casing especially for demounting from a rim mounted on the platform 16. For this purpose, the shaft 51 of the telescoping jack 50 carries at its upper end a jacking plate 52; its side surface which faces the center point 31 is slightly concave. Adjusting the position of the jack 50 along the slot 44 permits the plate concave surface 53 to be fitted close outward of the outer edge of the flange of such a dual-flanged rim; and its upward telescoping movement pries the casing upward, to remove it from the rim.

For mounting casings onto dual-flanged rims, means are provided on the upper ends 55 of the shafts 37 to deflect the bead of such a tire casing over the upper flange of such a rim. Such means advantageously move contrarotatingly outward from left to right in FIG. 1, above the middle plane $b$ of such a rim. The preferred means are a pair of telescoping bead deflector guide arms generally designated 56. Each of these includes an outer square tube 57, welded to a collar 58 which fits over and onto the upper end 55 of one of the shafts 37. Fitted slidably within the outer square tube 57 is an inner square tube 59 carrying at its outer end a bead deflector guide shoe 60, whose toe portion 61 will extend below the upper flange of such a rim. When the rack 40 is moved to the right, to turn the pinion gears 39 in opposite directions, the toe portions 61 of the two bead deflector guide shoes 60 will follow around the upper flange of such a rim, in opposite semicircular arcuate paths, from the position facing to the right as shown in FIGS. 1 and 2 to a final position facing to the left. Since the guide shoes 60 fit inwardly of the bead of such a tire casing, the telescoping tubes 57, 59 permit them to follow the rim precisely.

Near the right end of the side box beams 13 and set flush into their upper surfaces spacedly inward from the right end box beam 12, is a support channel 63, best seen in FIG. 2. It projects beyond one of the side box beams 13, as shown in FIGS. 1 and 2 a short distance; a stub channel 64 projects from the right end box beam 12 a similar distance. On their projecting portions is mounted a conventional hydraulic pump and accumulator 65 having an access plate 66, these items being shown schematically. Onto the accumulator and pump assembly 65 so shown, is supported an electric motor 67 which powers them through conventional tubing, not shown, these elements supply hydraulic pressure to the rack actuator cylinder 42, the telescoping jack 50, and the other hydraulic actuators hereinafter to be described.

Extending upward from the fixed frame 10, and structurally a part of the frame, is a mount assembly. It includes a vertical fixed mount plate 70, supported on the channel 53 and backed up by two spaced-apart rigid gussets 71 which taper downward and aft to the upper surface of the right end box beam 12, to which they are welded. Between them a deck plate 72 is provided extending atop the right end box beam 12, to the support channel 63. An operator standing on the plate 72 can manipulate a set of control levers generally designated 73, which control the supply of hydraulic fluid from the accumulator 65 to the various hydraulic actuators described.

Extending through the fixed mount plate 70 at about the level of the plane $b$ is a heavy horizontal mount pin 72, to which is secured a reversible actuator mount, generally designated 74. It includes a rotatable actuator mount plate 75, which may be circular and whose rear surface may bear against the forward surface of the fixed backing plate 70. The rotatable plate 75 carries a first actuator mount bracket 76 and a second, diametrically opposite actuator mount bracket 77, each having a lateral pivot pin 78. As seen from FIGS. 1 and 2, in normal position the actuator mount brackets 76, 76 are aligned vertically with the mount pin 72. Mechanism supported by an upright frame member 79 serves to turn the plate 75 reversibly through a 180° angle. Thus, the pin 72 is turned by a pinion gear 80, mounted on its outer end, and engaged by a rack 81 moved laterally by a mount-reversing hydraulic actuator 82. As shown in FIGS. 1 and 3, this actuator 82 is supported on a frame member 79, which extends upward from one of the side box beams 13. Extension of the actuator 82, to the right from the position shown in FIG. 3, will rotate the circular mount plate 75, in the sense shown by the arrow in FIG. 3 through an angle of 180°. This results in repositioning the first and second actuator mount brackets 76, 77, and the actuators mounted by them which are to be described, as shown in dashed lines in FIG. 2.

A first hydraulic-powered manipulating linear actuator, generally designated 83, has an outer cylindrical actuator part 84 terminating in a clevis end 85 bored laterally to pivot on the lateral pivot pin 78. At the innermost end of the outer cylindrical part 84, facing the plane $b$, is a clevis 86 having a lateral pin 78, which mounts the inner-projecting end of the piston shaft part 88 of a second manipulating linear actuator generally designated 90. The outer cooperating of this actuator 90 is a hydraulic cylinder 91, having a clevis mounting end 92 secured on a lateral pivot pin 78 to the second actuator mount bracket 77.

The second manipulating actuator 90, like the first manipulating actuator 83, is of the reversible type. When neither is being actuated, they provide, together with the circular mount plate 75, a triangulated structure, rigidly supported by the backing plate 70. However, when by movement of an associated control lever 73, hydraulic fluid is supplied to the second actuator 90 to change its length, for example, to shorten it in a manner shown in phantom lines in FIG. 2, the first actuator 83 is swung in a vertical plane about the pivot pin 78 which attaches it to mount plate 75, moving it in a direction perpendicular to its linear axis.

If the first actuator 83 be extended while the second actuator 90 is maintained at a fixed length, its axial extension will extend its shaft 94 and the shovellike shoe member 95 at its end, so that this member will apply a force against the tread and sidewall of a tire casing when positioned on a rim secured on the platform 16. The show 95 is stabilized and rotation is prevented by a telescoping assembly consisting of a tube 96 mounted to the side of the cylinder part 84 of the first actuator 83, and a rod 97 affixed to the shoe 95 and reciprocable within the tube 96.

Mechanism to traverse the platform 16 is best seen in FIGS. 1 and 3. A pair of clevis brackets 101 are mounted to the inner, forward-projecting surface of the left end box beam 11. Secured to these brackets 101 are the shafts 102 of a pair of horizontally positioned traversing actuators generally designated 103, preferably being conventional reversible hydraulic cylinders, controlled simultaneously by one of the control levers 73. Heavy square brackets 104, shown in FIG. 3, mount the actuators 103 rigidly to the undersurface of the platform plate 17. Extension of the actuators 103 will cause movement of the traversing platform 16, with all the assemblies mounted on it, to the right as shown in phantom lines in FIG. 2; their retraction causes a reverse movement of the platform 16.

For either mounting a tire casing on a rim, or demounting it, the rim is first mounted by the clamping feet 28 in horizontal position, as in my said U.S. Pat. No. 3,489,198. The steps to mount a casing on such rim, described in said patent and illustrated in its FIGS. 3a to 3e, underlie the use of the present apparatus to mount casings; similarly, to remove casings from rims, the series of steps there described and illustrated in FIGS. 4a to 4c underlie the use of the present apparatus. In the present use, however, the second actuator 90 and traversing actuators 103 are utilized independently of the other controls but simultaneously and in varying amounts. Thus for tire mounting, the bead level is maintained by the second actuator 90 and the traversing actuators 103 vary the beyond-center shift of the casing sidewall, as the bead deflector guide arms 56 are rotated to follow the rim and deflect each bead thereover. Likewise in the tire removal operation, the traversing actuators 103 adjust the beyond-center shift of the tire sidewall and the triangulating actuator 90 adjusts the level at which a casing bead is maintained, while the telescoping jack 50 drives the sidewalls vertically upward over the rim.

An operator skilled in using the present apparatus can, by manipulation of the controls 73 for the first actuator 83, second actuator 90 and the traversing actuators 103, utilize the shoe 95 as if it were a powerful hand, capable of pressing the tread and sidewall of a tire casing with any desired variation of components of force in a vertical plane. When the first and second actuators 83, 90 are in the position shown in solid lines in FIG. 2, the shoe 95 is in position to exert an upward force, not merely along the axis of the first actuator 83, but with increasing or decreasing components perpendicular thereto in the vertical plane, by simultaneous manipulation of the controls 73 for these two actuators. When the triangulated positions of these actuators have been reversed, by the reversing mechanism heretofore described, the shoe 95 may exert a downward force whose components may be similarly varied, subject to the control of the operator.

The horizontal linear actuators 103 which traverse the platform of 16 reversibly toward and away from the actuator mounting 74, are used in several ways. First, the operator may bring the rim, mounted on the C-shaped clamps 28, closer to the actuator mount 74, to compensate for differences in casing diameter and of width of the rim as compared to the fixed dimensions of the triangulated assembly on the actuator mounts 74. Secondly and more significantly, he can extend the first actuator 83 and simultaneously traverse the platform 16 either toward or away from the actuator mount 74, thereby to add to or diminish the horizontal component of force being applied by the shoe 95. Thus, the platform-traversing actuators 103 in effect modulate the horizontal force component applied by the shoe 95. The shoe 95 may therefore apply a force more or less horizontally than would be applied by the first actuator 83 alone; much as the second manipulating actuator 90 permits it to apply a force more or less vertically than could the actuator 83 alone.

This ability to modulate forces and movements is useful at varied states in mounting and demounting casings; for example, as the bead deflector guide assemblies are being rotated by the rack actuator cylinder 42, or while the telescoping hydraulic jack 50 is being raised to demount the tire.

During this demounting operation, control of the second actuator 90 permits the operator to hold the sidewall opposite the jack 50 at any desired level, while control of the traversing actuators adjust the spacing between the shoe member 95 and the platform on which the rim is mounted, thus controlling the extent to which the bead is positioned horizontally beyond center.

The horizontal movement supplied by the traversing actuators 103, when coupled with the substantially vertical shoe movement supplied by the second actuator 90, yields a variable diagonal force component which may be additive to that of the first actuator 83, to double the effective range of its movement. Alternately, a variable diagonal force component so supplied may substitute for movement of the first actuator, which may then remain unextended.

I claim:
1. Apparatus for mounting a pneumatic tire casing onto a dual-flanged wheel rim, comprising
means to secure such a rim at a fixed level with its middle plane horizontal and its upper flange free,
means to deflect a bead of such tire casing progressively around and over the upper flange of such rim,
an actuator mount, positioned spacedly outward from the means to secure such a rim and extending vertically above and below the middle plane thereof, together with
a first powered linear actuator having an outer actuator part adjacent to the mount and secured at its outermost end on a lateral pivot thereto at a point spaced from the level of the middle plane of such rim, and having an inner actuator part axially extendable and retractable relative to the outer part along an actuator axis, and having at its innermost end, shoe means to apply a force against the tread and a sidewall of such a tire casing when positioned for mounting on such rim,
a second powered linear actuator including parts extendable and retractable relative to each other along an axis and mounted in the same plane as that of the first linear actuator,
said second actuator being secured, at the outermost end of one of its said parts, by a lateral pivot to said mount at a point spaced from the level of the middle plane of such rim at the side opposite that at which the first linear actuator is secured, and being secured, at the innermost end of said other of its said parts, by a lateral pivot to the innermost end of the outer actuator part of the first actuator,
whereby to form, with it and with said mount, a triangulated structure of which said second actuator is a variable-length member, and
control means to vary the length of said second linear actuator while the first linear actuator or the means to deflect the bead are moving,
whereby the shoe means will move, and exert against such tire casing a force component, perpendicular to the axis of the first actuator.
2. Apparatus as defined in claim 1,
the said means to secure the rim having
a traversing platform,
the apparatus including a frame having longitudinal track means to direct the platform toward and away from said mount, together with
powered actuator means, controllable independently of the first and second linear actuators, to traverse the platform reversedly along said track means while said bead deflector means or first or second linear actuators are moving,
whereby to effect relative translatory movement of the point at which the shoe applies its force and supply a horizontal component thereto while the second actuator supplies a largely vertical component.
3. Apparatus for mounting a pneumatic tire casing onto and demounting such casing from a dual-flanged wheel rim, comprising
the apparatus defined in claim 2, together with
jack means, carried by the platform spaced from said rim-securing means at the side thereof opposite to said means to apply a local force, to apply a substantially vertical force to the under sidewall of such a tire casing, and
power actuator means, controllable independently of the said platform-traversing means and first and second linear actuators, to elevate said jack means while the said platform-traversing means or said first or said second actuators are moving, whereby to adjust the position of application of such substantially vertical force relative to the shoe means while its position and the direction of its force application are varied.